US006765708B2

(12) United States Patent
Davies

(10) Patent No.: US 6,765,708 B2
(45) Date of Patent: Jul. 20, 2004

(54) OPTICAL DUOBINARY SINGLE SIDEBAND MODULATOR

(75) Inventor: Robert James Davies, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 10/349,534

(22) Filed: Jan. 21, 2003

(65) Prior Publication Data

US 2003/0138181 A1 Jul. 24, 2003

Related U.S. Application Data

(60) Provisional application No. 60/349,408, filed on Jan. 22, 2002.

(51) Int. Cl.$^7$ .............................................. G02B 26/00

(52) U.S. Cl. ...................................... 359/238; 398/81

(58) Field of Search ............................ 359/238; 398/81, 398/183, 188; 385/1, 3

(56) References Cited

U.S. PATENT DOCUMENTS

| | | | | |
|---|---|---|---|---|
| 5,301,058 | A | 4/1994 | Olshansky | 359/188 |
| 5,880,870 | A | 3/1999 | Sieben et al. | 359/181 |
| 5,949,926 | A | 9/1999 | Davies | 385/3 |
| 5,999,300 | A | 12/1999 | Davies et al. | 359/183 |
| 6,424,444 | B1 * | 7/2002 | Kahn et al. | 398/141 |
| 6,661,976 | B1 * | 12/2003 | Gnauck et al. | 398/183 |

OTHER PUBLICATIONS

Dispersion Compensation by differential time delay, A. Djupsjobacka, O. Sahlen, IEEE Journal of Lightwave Technology, vol. 12, No. 10, pp. 1849–1853, Oct. 1994.

10 Gb/s 360–km transmission over normal–dispersion fiber using mid–system spectral inversion, R. M. Jopson, A. H. Gnauck, R. M. Derosier, Proceedings OFC'93, paper PD3, 1993.

Frequency chirping in external modulators, F. Koyama, K. Iga, IEEE Journal of Lightwave Technology, vol. 6, No. 1, pp. 87–93, Jan. 1988.

Dispersion penalty reduction using an optical modulator with adjustable chirp, A. H. Gnauck, S. K. Korotky, J. J. Veselka, J. Nagel, C. T. Kemmerer, W. J. Minford, D. T. Moser, IEEE Photonics Technology Letters, vol. 3, No. 10, pp. 916–918, Oct. 1991.

Chromatic dispersion compensation in coherent optical communications, K. Iwashita, N. Takachio, Journal of Lightwave Technology, vol. 8, No. 3, pp. 367–375, Mar. 1990.

Equalization in coherent lightwave systems using microwave waveguides, J. H. Winters, Journal of Lightwave Technology, vol. 7, No. 5 pp. 813–815, May 1989.

Equalization in coherent lightwave systems using a fractionally spaced equalizer, J. H. Winters, Journal of Lightwave Technology, vol. 8, No. 10, pp. 1487–1491, Oct. 1990.

(List continued on next page.)

Primary Examiner—George Epps
Assistant Examiner—Richard Hanig
(74) Attorney, Agent, or Firm—Christensen O'Connor Johnson Kindness PLLC

(57) ABSTRACT

An apparatus for modulating information bearing symbols onto an optical carrier includes a polybinary coder that operates on a binary information signal to produce an envelope compatible polybinary signal; and an optical single sideband modulator that modulates an optical carrier with the envelope compatible polybinary signal to produce a single sideband optical signal. This provides an improvement over both polybinary signaling and optical single sideband. This action combines the chromatic dispersion advantages of SSB modulation with the DC level and bandwidth reduction of duo-binary coding.

7 Claims, 1 Drawing Sheet

Duo-binary (Polybinary) Envelope Compatible Single Sideband Modulator

OTHER PUBLICATIONS

Optical duobinary transmission system with no receiver sensitivity degradation, K. Yonenaga, S. Kuwano, S. Norimastu, N. Shibata, electronics Letters, vol. 31, No. 4, pp. 302–304, Feb. 1995.

Extended 10 Gb/s fiber transmission distance at 1538 nm using a duobinary receiver, IEEE Photonics Technology Letters, vol. 6, No. 5, pp. 648–650, May 1994.

Integrated optical SSB modulator/frequency shifter, IEEE Journal of Quantum Electronics, vol. QE–17, No. 11, pp. 2225–2227, Nov. 1981.

Optical Single Sideband (OSSB) Transmission for Dispersion Avoidance and Electrical Dispersion Compensation in Microwave Subcarrier and Baseband Digital Systems, J. Conradi, B. Davies, M. Sieben, D. Dodds, S. Walklin, OFC 97 Postdeadline, Feb. 1997.

10 Gb/s optical single sideband system, M. Sieben, J. Conradi, D. Dodds, B. Davies, S. Walkin, Electronics Letters, vol. 33, No. 11, pp. 971–973, Jun. 1997.

A Fiber chromatic dispersion compensation technique with an optical SSB transmission in optical homodyne detection systems, K. Yonenaga, N. Takachio, IEEE Photonics Technology Letters, vol. 5, No. 8, pp. 949–951, Aug. 1993.

Dispersion compensation for homodyne detection systems using a 10 Gb/s optical PSK–VSB signal, K. Yonenaga, N. Takachio, IEEE Photonics Technology Letters, vol. 7, No. 8, pp. 929–931, Aug. 1995.

A spectral theory for hybrid modulation, G. B. Lockhart, IEEE Transactions on Communications, vol. COM 21, No. 7, Jul. 1973.

* cited by examiner

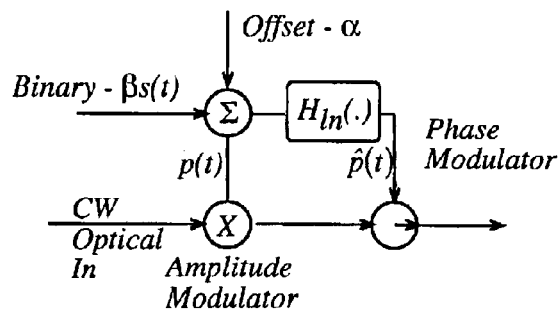
*Figure 1. Minimum Phase SSB Modulator*
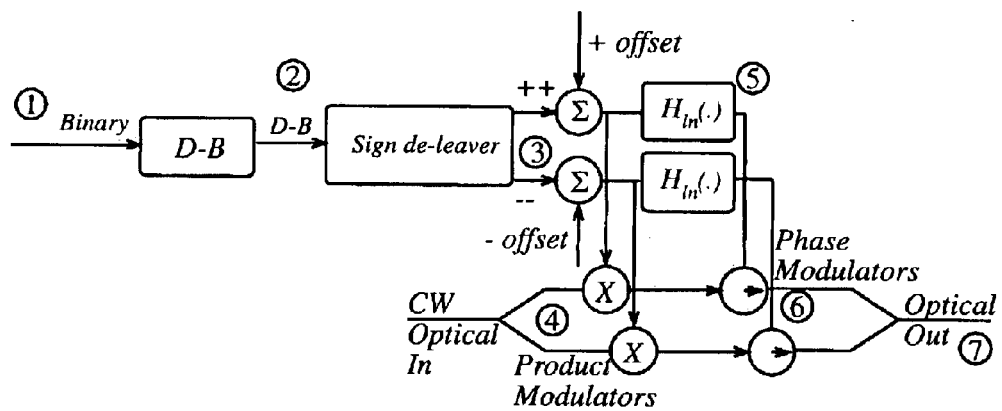
*Figure 2. Duo-binary (Polybinary) Envelope Compatible Single Sideband Modulator*

OPTICAL DUOBINARY SINGLE SIDEBAND MODULATOR

CROSS-REFERENCE TO RELATED APPLICATION

This application claims the benefit of the filing date of U.S. Provisional Application No. 60/349,408, filed Jan. 22, 2002.

BACKGROUND OF THE INVENTION

Optical fiber transmission systems are subject to distortion related to loss, noise, and nonlinearities in both the fiber and the modulation and amplification devices. One of the more deleterious forms of signal distortion is that due to chromatic dispersion. Chromatic dispersion in optical fiber is typically characterized by a linear (non-flat) group delay parameter. The group refractive index of the fiber at optical frequencies near a given optical carrier frequency varies approximately linearly with wavelength or optical frequency about the carrier. This finite linear group delay imposes a quadratic phase rotation across the signal frequency band which translates to intersymbol interference in the time domain signal. The fact that a large portion of the fiber in use today is dispersive at the desired operating wavelengths dictates that economic solutions are required.

Approaches currently used to reduce the effects of chromatic dispersion include: (1) reversing the effects of chromatic dispersion in the optical domain, (2) reversing the effects in the electrical domain after optical detection and (3) reducing the transmission bandwidth of the optical signal on the fiber. The first is based on purely optical methods where the effects of group velocity dispersion are reversed while the signal is still in the optical domain. Adding dispersion compensating fiber in the transmission path is one common approach. Other optical methods include compensation by differential time delay of the upper and lower sidebands of the modulated signal, see A. Djupsjobacka, O. Sahlen, "Dispersion compensation by differential time delay," IEEE Journal of Lightwave Technology, vol. 12, no. 10, pp. 1849-1853, October 1994, spectrally inverting the signal at the midpoint of the transmission path, see R. M. Jopson, A. H. Gnauck, R. M. Derosier, "10 Gb/s 360-km transmission over normal-dispersion fiber using mid-system spectral inversion," Proceedings OFC'93, paper PD3, 1993; and pre-chirping the transmitted signal in an external modulator, see F. Koyama, K. Iga, "Frequency chirping in external modulators," IEEE Journal of Lightwave Technology, vol. 6, no. 1, pp. 87-03, January 1988, and A. H. Gnauck, S. K. Korotky, J. J. Veselka, J. Nagel, C. T. Kemmerer, W. J. Minford, D. T. Moser, "Dispersion penalty reduction using an optical modulator with adjustable chirp," IEEE Photonics Technology Letters, vol. 3, no. 10, pp. 916-918, October 1991.

The second approach, in which dispersion effects are reversed in the electrical domain, is based on coherent transmission and homodyne detection followed by equalization in the electrical domain. Homodyne detection is only effective on single sideband signals. If homodyne detection were attempted with a DSB signal, the upper and lower sidebands would overlap upon detection and the phase information would be lost and the higher modulation frequencies severely attenuated or distorted through frequency selective fading. Some techniques used or proposed for post-detection equalization include the use of microstrip lines, see K. Iwashita, N. Takachio, "Chromatic dispersion compensation in coherent optical communications," Journal of Lightwave Technology, vol. 8, no. 3, pp. 367-375, March 1990; microwave waveguides, see J. H. Winters, "Equalization in coherent lightwave systems using microwave waveguides," Journal of Lightwave Technology, vol. 7, no. 5, pp. 813-815, May 1989, and fractionally spaced equalizers, see J. H. Winters, "Equalization in coherent lightwave systems using a fractionally spaced equalizer," Journal of Lightwave Technology, vol. 8, no. 10, pp. 1487-1491, October 1990.

The third approach is to modify the transmission format so that the baseband signal spectrum is compressed. These types of approaches, which reduce the transmission bandwidth required on the fiber to transmit a given bit rate, are generally implemented by modifying the line code format in order to reduce the effective bandwidth required to transmit or receive the data, see K. Yonenaga, S. Kuwano, S. Norimatsu, N. Shibata, "Optical duobinary transmission system with no receiver sensitivity degradation," Electronic Letters, vol. 31, no. 4, pp. 302-304, February 1995, and G. May, A. Solheim, J. Conradi, "Extended 10 Gb/s fiber transmission distance at 1538 nm using a duobinary receiver," IEEE Photonics Technology Letters, vol. 6, no. 5, pp. 648-650, May 1994.

More recently it has been shown that optical single sideband transmission (OSSB) can combat some of the deleterious effects of chromatic dispersion. OSSB provides a dispersion benefit directly by reducing the signal bandwidth and also by aiding in the signal restoration through post-detection dispersion compensation. The generation, transmission and detection of single sideband (SSB) signals has been used for both baseband and the RF and microwave regions of the electromagnetic spectrum to reduce the bandwidth of the signal by a factor of two, by sending either the upper or the lower sideband. Generation and transmission of OSSB optical signals using a Mach-Zehnder modulator is shown in M. Izutsu, S. Shikama, T. Sueta, "Integrated optical SSB modulator/frequency shifter," IEEE Journal of Quantum Electronics, vol. QE-17, no. 11, pp. 2225-2227, November 1981, and R. Olshansky, "Single sideband optical modulator for lightwave systems," U.S. Pat. No. 5,301,058, 1994. Methods based on AM compatible radio modulators were outlined in Jan Conradi, Bob Davies, Mike Sieben, David Dodds and Sheldon Walklin, "Optical Single Sideband (OSSB) Transmission for Dispersion Avoidance and Electrical Dispersion Compensation in Microwave Subcarrier and Baseband Digital Systems", OFC 97 Postdeadline, February 1997, and M. Sieben, J. Conradi, D. Dodds, B. Davies, and S. Walklin "10 Gbit/s optical single sideband system" Electronics Letters Vol. 33, No. 11, pp 971-973. Sieben; Michael J., Conradi; Jan, Dodds; David E., U.S. Pat. No. 5,880,870, Mar. 9, 1999 Optical modulation system Robert J. Davies, Jan Conradi, David Dodds, Hybrid Single Sideband Optical Modulator. U.S. Pat. No. 5,999,300, Dec. 7, 1999., and Robert J. Davies, Minimum Phase Dispersion Compensator, U.S. Pat. No. 5,949,926, Sep. 7, 1999. The structures outlined in these documents addressed the need for large added carrier in the transmitted optical signal by using approximations to time domain minimum phase signals with single sideband properties. This allowed the transmitted information to be directly modulated onto the optical electric field envelope while a special phase function was incorporated into the AM signal to cancel all or part of an information sideband.

While in digital optical SSB modulation a dispersion benefit accrues directly due to the fact that the transmitted signal spectrum has been reduced, the more significant advantage of optical SSB transmission is that the fiber dispersion can be compensated in the electrical domain after detection. This advantage is similar to that for heterodyne detection of DSB signals, but with SSB transmission and detection, the signal can be homodyned directly to baseband using carrier signal added either at the source or at the receiver and thus it can be directly detected with the phase or delay information of the transmitted signal preserved. This was shown in K. Yonenaga, N. Takachio, "A Fiber chromatic dispersion compensation technique with an optical SSB transmission in optical homodyne detection systems," IEEE Photonics Technology Letters, vol. 5, no. 8, pp. 949-951, August 1993, where integrated optical structures were used to generate single sideband tones for narrowband applications. In K. Yonenaga, N. Takachio, "Dispersion compensation for homodyne detection systems using a 10 Gb/s optical PSK-VSB signal," IEEE Photonics Technology Letters, vol. 7, no. 8, pp. 929-931, August 1995, a single sideband optical modulator was described for the purpose of transmitting two or more optical signals with different optical carrier frequencies on a single fiber. The purpose of transmitting the signals in a single sideband format is to permit these optical carrier frequencies to be spaced as closely as the maximum modulation frequency. A fundamental disadvantage of this type of dispersion compensation is found in the fact that the carrier power added to the transmitted signal must be significant thus reducing the potential signal to noise ratio at the transmitter.

To improve this situation the virtues of polybinary (or duo-binary) modulation may be applied. The term polybinary refers to a modification of a binary signal in which the levels have been altered so as to maintain the information while removing some of the DC content of the signal and reducing the bandwidth. The most common implementation of this type of signal is the duobinary signal where a two level binary signal is converted to a three level signal represented by a zero voltage level and two levels symetrically located at positive and negative voltage levels with respect to the zero voltage level. The non-zero voltage level represent logical zeros and the zero level represents logical ones. These signals are part of a class of signals referred to as correlative coding or partial response signals, so named because they allow a controlled amount of inter-symbol interference to achieve another advantage such as reduced bandwidth and reduced dc content. See Lender, A., "The Duo-Binary Technique of High Speed Data Transmission." AIEE Transaction on Communication Electronics," vol. 82, pp 214-218.

The coding rule for a duobinary signal generated from a binary signal where a logical zero or a 'space' is represented by −1 and a logical one or a 'mark' is represented by a +1 is given by $$c_k = b_k + b_{k-1} \quad (1)$$

where $b_k$ is the $k^{th}$ element of binary sequence defined above. The resulting 3 level sequence is called a duo-binary sequence and the data sequence $b_k$ may be recovered from $c_k$ by the following rule $$b_k = c_k - b_{k-1} \quad (2)$$

The immediate advantage of this type of signal is a reduced bandwidth requirement for a given information rate. The disadvantage is related to the fact that a single symbol error will propagate through the data sequence due to correlation between the symbols. To overcome this a precoding scheme may be used. In this case the binary information is unipolar in that a mark is represented as a 1 and a space is represented as a 0. An intermediate pre-coded sequence is generated as in $$a_k = b_k \oplus a_{k-1} \quad (3)$$

where ⊕ denotes modulo-2 addition. The precoder output is scaled so that a space is represented as a −1 and a mark is represented as a +1. The precoded sequence is used to produce the duobinary sequence according to (1) above ($c_k = a_k + a_{k-1}$) with the added advantage that the duobinary sequence so generated has independent symbols and is immune to error propagation. The data may be recovered in envelope detection format by simply determining the magnitude of the duobinary signal and scaling so that the recovered data sequence is represented by 1's and 0's as in $$\hat{b}_k = \begin{cases} 0 & |c_k| > 1 \\ 1, & |c_k| \le 1 \end{cases} \quad (4)$$

A sample data sequence with precoding and duobinary encoding is shown in Table 1.

TABLE 1

Sample duobinary coding.

| $b_k$ |   | 0 | 0 | 1  | 0  | 1 | 1  | 0  |
|-------|---|---|---|----|----|---|----|----|
| $a_k$ | 1 | 1 | 1 | −1 | −1 | 1 | −1 | −1 |
| $c_k$ |   | 2 | 2 | 0  | −2 | 0 | 0  | −2 |

The information sequence $b_k$ is mapped into $c_k$ such that the individual symbols are independent and the bandwidth requirement for a given information rate is halved. Other types of correlative coding are possible if the coding rule is allowed to be more complicated. Some of these more complicated schemes are known as modified duobinary and alternate mark inversion. Additionally a binary signal may be mapped into a multilevel or polybinary signal where there are 5, 7 or more amplitude levels.

The spectral density function of the duo-binary signal based on the coding rule above is given by $$H(f) = \begin{cases} 2\cos(\pi f T_b)\exp(-j\pi f T_b) & |f| \le \dfrac{1}{2T_b} \\ 0 & \text{otherwise} \end{cases} \quad (5)$$

From the optical direct detection perspective, the reduction of the dc component compared to the binary case and the bandwidth reduction inherent in duobinary coding are the most favourable benefits of duobinary signaling along with the fact that the signal is recoverable by envelope detection. Complete removal of the dc component may be achieved for a different coding rule known as modified duo-binary. In this case the precoder rule is given by $$a_k = b_k \oplus a_{k-2} \quad (6)$$

and the correlation span for the coder is 2 digits rather than 1 as in $$c_k = a_k - a_{k-2} \quad (7)$$

Table 2 shows the modified duobinary coding method.

TABLE 2

Modified duobinary coding example

| $b_k$ |   |   | 0 | 0 | 1  | 0 | 1 | 0 | 1  | 1  | 1 | 0  |
|-------|---|---|---|---|----|---|---|---|----|----|---|----|
| $a_k$ | 1 | 1 | 1 | 1 | -1 | 1 | 1 | 1 | -1 | -1 | 1 | -1 |
| $c_k$ |   |   | 0 | 0 | -2 | 0 | 2 | 0 | -2 | -2 | 2 | 0  |

The spectral density for the modified duo-binary coding rule is given by $$H(f) = \begin{cases} 2j\sin(\pi f T_b)\exp(-j\pi f T_b) & |f| \leq \frac{1}{2T_b} \\ 0 & \text{otherwise} \end{cases} \quad (8)$$

where it is noted that the DC component is zero valued. Thus for a trade-off in coder length, an SNR advantage is gained in the sense that none of the finite power of the optical signal is wasted on the non-information carrying DC or carrier component of the signal.

For the polybinary case we may consider the case where a binary signal is converted into a signal with j levels that are numbered form 0 to j−1. The coding rule in this case is given by $$a_k = b_k \oplus a_{k-1} \oplus a_{k-2} \oplus \ldots a_{k-(j-2)} \quad (9)$$

The precoded sequence is then converted to the j level signal using $$c_k = a_k + a_{k-1} + \ldots + a_{k-(j-2)} \quad (10)$$

where the spaces in the sequence 'a' have been changed from zero to −1. Note that the correlation span now covers a length of j−1 digits. The demodulation rule is slightly more difficult than the duo-binary case in that marks are taken from the odd levels in the polybinary sequence and the spaces are taken from the even levels. Nonetheless the information is still recoverable using envelope detection techniques.

SUMMARY OF THE INVENTION

This invention provides an improvement over both polybinary signaling and optical single sideband by implementing polybinary modulation on a single sideband modulator. This action combines the chromatic dispersion advantages of SSB modulation with the DC level and bandwidth reduction of duo-binary coding.

Therefore there is provided an apparatus for modulating information bearing symbols onto an optical carrier, the apparatus comprising a polybinary coder that operates on a binary information signal to produce an envelope compatible polybinary signal; and an optical single sideband modulator that modulates an optical carrier with the envelope compatible polybinary signal to produce a single sideband optical signal.

In a further aspect of the invention, the polybinary coder produces an envelope compatible polybinary signal by dividing a polybinary signal into at least a pair of unipolar signals. In a further aspect of the invention, the polybinary coder produces an envelope compatible polybinary signal by separately operating on a polybinary signal in a first stream to convert all negative symbols in the polybinary stream to zero symbols and in a second stream to convert all positive symbols in the polybinary signal to zero symbols.

In a further aspect of the invention, the optical single sideband modulator operates on the optical carrier using the envelope compatible polybinary signal to produce a single sideband optical signal whose phase is determined by operating on the output of the polybinary coder with a Hilbert transform and whose magnitude is determined by the magnitude of the output of the polybinary coder. The output of the polybinary coder may be converted by a logarithmic operator prior to input to the Hilbert transform. The output of the polybinary coder may be adjusted to avoid singularities in the operation of the logarithmic operator.

BRIEF DESCRIPTION OF THE FIGURES

There will now be described a preferred embodiment of the invention with reference to the drawings, in which like reference characters denote like elements, by way of illustration only, and in which:

FIG. 1 is a diagram showing a prior art minimum phase single sideband modulator; and FIG. 2 is a diagram showing a polybinary envelope compatible single sideband modulator.

DETAILED DESCRIPTION OF PREFERRED EMBODIMENTS OF THE INVENTION

An improvement over both polybinary signaling and optical single sideband may be obtained when polybinary modulation is implemented on a single sideband modulator. This action combines the chromatic dispersion advantages of SSB modulation with the DC level and bandwidth reduction of duo-binary coding. To illustrate this, we consider the basic theory of envelope compatible signal sideband modulation. Generation of single sideband is based on the analytic signal. Let A(t) be a bandlimited analytic signal defined by $$A(t) = s(t) + j\hat{s}(t) \quad (11)$$

where s(t) is a real baseband or subcarrier information signal and ŝ(t) is the Hilbert Transform of s(t) defined as $$\hat{s}(t) = \frac{j}{\pi} \int_{-\infty}^{\infty} \frac{s(t')}{t - t'} dt' \quad (12)$$

The signal defined in (11) will have no negative frequency content in its Fourier transform. Let q(t) be a bandpass signal defined by $$q(t) = A(t)\exp(j\omega_0 t) \quad (13)$$

Clearly, if A(t) is analytic with no negative frequencies then q(t) is a single sideband signal. Note that q(t) is also analytic and has no negative frequency content however we refer to q(t) as a single sideband signal since there is only one sideband at the point in the signal spectrum represented by the carrier term $\omega_0$.

Now let A(t) be represented in polar form by $$A(t) = |A(t)|\exp\{j \, \arg[A(t)]\} \quad (14)$$

Equation (13) now becomes $$q(t) = |A(t)|\exp\{j \, \arg[A(t)]\}\exp(j\omega_0 t) \quad (15)$$

which is a combination of amplitude and phase modulation imposed on the complex carrier. For direct detection optical systems the modulating signal in (15) using the information signal defined as in (11) is unsuitable on direct detection optical systems since coherent detection is required to extract the information signal. This situation is partially rectified by adding carrier to the modulated signal which, through square law detection, will allow recovery of a distorted information signal (s(t)). The deficiency may be eliminated however by ensuring that the modulating signal is single sideband but also minimum phase in the time domain.

The minimum phase modulator is shown in FIG. 1. The term minimum phase is used due to the fact that the modulated signal has the characteristic relationship between the magnitude and phase that is observed in minimum phase signals. See Gordon B. Lockhart, "*A Spectral Theory for Hybrid Modulation*", IEEE Transactions on Communications, Vol. COM 21, No. 7, July 1973. As shown in FIG. 1, the information signal 's(t)' is scaled and then a small DC offset is added to ensure that the information signal is positive and envelope detectable. This yields the signal $$p(t)=\alpha+\beta s(t) \qquad (16)$$

where α and β are constants. Next, the Hilbert transform of the natural log (ln) of p(t) is acquired as in $$\hat{p}(t)=H\{ln[p(t)]\}=H_{ln}[p(t)] \qquad (17)$$

At this point p(t) and $\hat{p}(t)$ are combined and modulated onto the optical carrier through the cascaded amplitude and phase modulators which yields an optical signal with the Minimum Phase complex envelope given by $$A_{mp}(t)=p(t)\exp[j\hat{p}(t)] \qquad (18)$$

Clearly there is a fixed relationship between the amplitude and phase of (18). Additionally $A_{mp}(t)$ is still analytic and as such has no negative frequencies. A complex signal composed in the above manner may be modulated onto the optical carrier to create a single sideband signal in a variety of optical modulator structures such as: (1) A laser diode intensity modulator in cascade with a external phase modulator (2) An external amplitude modulator in cascade with a external phase modulator or (3) A laser diode modulator configured for FM operation in cascade with an external amplitude modulator. The critical characteristic from the direct detection optical aspect is that the information is contained in the envelope of the signal while the phase (which is lost in the square-law detection process) is present only to cancel a sideband of the optical signal. See Robert J. Davies, Jan Conradi, David Dodds, Hybrid Single Sideband Optical Modulator. U.S. Pat. No. 5,999,300, Dec. 7, 1999. Additionally it has been shown that approximations may be made in the signal synthesis that maintain significant spectral sideband cancellation while reducing the complexity of the signal conditioner. One of these approximations is to combine the signal as in the development above but to eliminate the step where the logarithm is taken ie.

$$\hat{p}(t)=\alpha H(p(t)) \qquad (19)$$

$\hat{p}(t)$ is combined with the envelope signal as in (18) and the resulting signal shows reduction in the required sideband. The modulator structure is reduced in complexity with the trade-off that the SSB signal emitted therefrom is non-ideal. See Robert J. Davies, Jan Conradi, David Dodds, Hybrid Single Sideband Optical Modulator. U.S. Pat. No. 5,999, 300, Dec. 7, 1999., and Robert J. Davies, Minimum Phase Dispersion Compensator, U.S. Pat. No. 5,949,926, Sep. 7, 1999.

The above modulators provide a number of approaches to envelope compatible SSB modulation however they all require a unipolar signal to synthesize the required phase function. Considering the combination of duo-binary and envelope compatible OSSB signaling, the raw duobinary signal is not unipolar and will not directly yield the correct phase function envelope compatible SSB. However modifications may be applied that allow duobinary envelope compatible single sideband. A duobinary signal may be represented as the superposition of two unipolar signals: one containing zeros and positive symbols which we designate ++ and the other containing zeros and the negative symbols which we designate −−. As an example consider the duobinary signal:

duobinary 1100−1011000−1−1

The constituent signals are ++ (1100001100000) and −− (0000−1000000−1−1). It can be shown that both of these signals have the reduced bandwidth of the original duobinary signal and since −− is simply a sign inverted unipolar signal, it is envelope compatible and amenable to that particular SSB conversion. The coding rule for the ++ signal is given by $$++_k=pos[c_k] \qquad (20)$$

where $c_k$ is a duobinary information stream and the pos operator converts all negative symbols to zeros. The coding rule for the −− sequence is $$--_k=neg[c_k] \qquad (21)$$

where the neg operator converts all positive bits to zeros. The ++ and −− information sequences are then converted to symbols and modulated individually in the CSSB format as outlined above and the resulting signals are combined to produce the envelope compatible duobinary signal.

The above embodiment apples to specifically to duobinary signals where the original binary stream is converted to a three level signal where the levels consist of positive, negative and zero symbols. Other types of coding may be applied where there are more than three levels in the coded data stream. This is referred to as polybinary and may be implemented in a similar manner as duobinary.

An embodiment of the duobinary SSB (DBSSB) modulator is shown in FIG. 2. At 1 the binary information is applied to the duobinary coder and converted to the required precoded doubinary sequence. At 2, the output from the duobinary encoder is split via the sign de-leaver into the negative (−−) and positive (++) signal streams. The information symbols may also be pulse shaped in some manner to bandlimit the signals as required by the modulating equipment. A small DC offset is added at 3 to prevent the formation of a singularity in the following log operation. This is only required where a log operation is implemented. If the approximate phase operation, where only the Hilbert transform of the binary data is used or an approximate log operation is used the input signal is immune to the formation of a singularity and the offset is not required.

The offset ++ and −− signals are modulated onto the optical carriers in product fashion at 4. At 5 the nonlinear operation required to produce phase signals to convert the double sideband envelope signals to single sideband is implemented. At 6 the phase signal is applied to a phase modulator to produce the optical single sideband signal for the ++ and − signals. At 7 the ++and − OSSB signals are added to yield the resulting duobinary OSSB envelope compatible signal. Note that in the addition process the optical carrier present from the modulation operation on the respective ++ and − signal is completely or nearly extinguished based on the type of duo-binary modulation used. Another way to view this is to consider that the − signal is actually a generalized positive signal with a phase shift of π rads with respect to the ++ signal. The DC level in the ++ and − signals will translate to the respective optical carriers as tonal or CW components that are at a phase angle of π rads with respect to each other in the subsequent additions of the optical signals at the combiner. The carrier components cancel each other resulting in carrier suppression at the combiner output. If we imagine that the raw binary signal contained in the ++ and −− information streams are converted to CSSB signal in the manner outlined in equations (14-16) the complex envelopes are given by $$p_{++}(t)=[\beta+\alpha s_{++}(t)]$$

$$a_{++}(t)=p_{++}(t)\exp[\hat{p}_{++,ln}(t)]$$

$$p_{--}(t)=[\beta+\alpha s_{--}(t)]$$

$$a_{--}(t)=p_{--}(t)\exp[\hat{p}_{--,ln}(t)]\exp(j\pi) \quad (22)$$

At the combiner these signals are added $$A_{comp}(t)=a_{++}(t)+a_{--}(t)=[\beta+\alpha s_{++}(t)]\exp[\hat{p}_{++,ln}(t)]+[\beta+\alpha s_{--}(t)]\exp(j\pi)\exp[\hat{p}_{--,ln}(t)] \quad (23)$$

The mean value of the expression in (23) represents the DC level of the associated spectral density function. Since $s_{++}$ and $s_{--}$ are independent random bipolar signals their respective means are small or zero depending on the type of duobinary coding used. Since the phase functions are independent but synthesized in a similar manner their means are approximately equal and $$<A_{comp}(t)> \approx k[\beta\exp(j\pi)+\beta] \approx 0 \quad (24)$$

The phase operation shown in FIG. 2 is required for the minimum phase version of the OSSB signal. Many versions of exact and approximate phase operations were outlined in Robert J. Davies, Jan Conradi, David Dodds, Hybrid Single Sideband Optical Modulator. U.S. Pat. No. 5,999,300, Dec. 7, 1999., and Robert J. Davies, Minimum Phase Dispersion Compensator, U.S. Pat. No. 5,949,926, and these may be applied to each of the modulator arms of the DBSSB modulator in FIG. 2. Further the synthesis of the envelope compatible polybinary PBSSB signal may be implemented in a number of different modulator types, the above embodiment being an example in the class.

Extension of the duobinary case to the more general polybinary case follows a similar development with pos and neg operators applied as above but to the multilevel polybinary signal. All other aspects of the embodiment are identical to the duobinary case. The polybinary signal is, again, envelope compatible with even signal levels at the detector output mapped to spaces and odd signal level mapped to marks.

Immaterial modifications may be made to the embodiments of the invention disclosed here without departing from the invention.

I claim:

1. An apparatus for modulating information bearing symbols onto an optical carrier, the apparatus comprising:
a polybinary coder that operates on a binary information signal to produce an envelope compatible polybinary signal; and
an optical single sideband modulator that modulates an optical carrier with the envelope compatible polybinary signal to produce a single sideband optical signal.

2. The apparatus of claim 1 in which the polybinary coder is a duobinary coder.

3. The apparatus of claim 1 in which the polybinary coder produces an envelope compatible polybinary signal by dividing a polybinary signal into at least a pair of unipolar signals.

4. The apparatus of claim 3 in which the polybinary coder produces an envelope compatible polybinary signal by separately operating on a polybinary signal in a first stream to convert all negative symbols in the polybinary stream to zero symbols and in a second stream to convert all positive symbols in the polybinary signal to zero symbols.

5. The apparatus of claim 1 in which the optical single sideband modulator operates on the optical carrier using the envelope compatible polybinary signal to produce a single sideband optical signal whose phase is determined by operating on the output of the polybinary coder with a Hilbert transform and whose magnitude is determined by the magnitude of the output of the polybinary coder.

6. The apparatus of claim 5 in which the output of the polybinary coder is converted by a logarithmic operator prior to input to the Hilbert transform.

7. The apparatus of claim 6 in which the output of the polybinary coder is adjusted to avoid singularities in the operation of the logarithmic operator.

* * * * *